(12) United States Patent
Chen et al.

(10) Patent No.: US 9,238,292 B2
(45) Date of Patent: Jan. 19, 2016

(54) METHOD FOR PRODUCING GOLF CLUB HEAD WITH ULTRA-THIN CROWN

(71) Applicant: LUOYANG SUNRUI PRECISION CASTING CO., LTD, Luoyang, Henan (CN)

(72) Inventors: Zhiqiang Chen, Henan (CN); Hongqiang Zhou, Henan (CN); Shujuan Bao, Henan (CN); Changhao Fu, Henan (CN)

(73) Assignee: LUOYANG SUNRUI TI PRECISION CASTING CO., LTD., Luoyang, Henan (CN)

( * ) Notice: Subject to any disclaimer, the term of this patent is extended or adjusted under 35 U.S.C. 154(b) by 1 day.

(21) Appl. No.: 14/162,555

(22) Filed: Jan. 23, 2014

(65) Prior Publication Data

US 2015/0147941 A1    May 28, 2015

(30) Foreign Application Priority Data

Nov. 27, 2013   (CN) .......................... 2013 1 0610083

(51) Int. Cl.
*B24B 1/00* (2006.01)
*B24B 19/26* (2006.01)
*A63B 53/04* (2015.01)
*G05B 19/18* (2006.01)

(52) U.S. Cl.
CPC ................ *B24B 19/26* (2013.01); *A63B 53/04* (2013.01); *B24B 1/005* (2013.01); *G05B 19/182* (2013.01)

(58) Field of Classification Search
CPC .......... B24B 1/00; B24B 1/005; B24B 31/006
USPC ...................... 451/63, 28, 283, 294
See application file for complete search history.

(56) References Cited

U.S. PATENT DOCUMENTS

| 2,514,116 A * | 7/1950 | Baker ....................... 15/104.095 |
| 2007/0135025 A1 * | 6/2007 | Huang ............................. 451/59 |

* cited by examiner

*Primary Examiner* — Robert Rose
(74) *Attorney, Agent, or Firm* — Muncy, Geissler, Olds & Lowe, P.C.

(57) ABSTRACT

The present invention discloses a method for producing a golf club head with an ultra-thin crown, relating to a method for processing a golf club head. A grinding rotor, with an abrasive (2) on the surface, is placed in a to-be-grinded area inside a cavity of the golf club head (1). The outside of the golf club head (1) is provided with a rotary working shaft (6) of high-speed rotation, one end of which corresponding to the grinding rotor is provided with driving magnets (4). The driving magnets of the rotary working shaft (6) are driven by a driving device to make the grinding rotor rotate synchronously so that the grinding rotor that is rotating performs multi-point thinning and grinding to the cavity within the to-be-grinded area of the golf club head (1). The present invention, with advantages of uniform thinning of a golf club head and automation control, is applicable to mass industrial production. The processing method and corresponding processing device provided by the present invention are applicable to production of golf club heads with an ultra-thin crown made of titanium alloy, stainless steel and other non-magnetic materials.

26 Claims, 3 Drawing Sheets

Fig 1

| Experiment Parameters | | | | | | Experiment results | | |
|---|---|---|---|---|---|---|---|---|
| Specification of magnets for the grinding rotor in the upper part | Specification of driving magnets on the bottom | Granularity of the abrasive for the grinding rotor | Distance from the driving magnets on the bottom to the low points on the top of the golf club head | Rotation speed for grinding | Time for cyclic grinding | Original thickness of each point on the top (mm) | Thickness of each point after grinding (mm) | Grinding and thinning amount (mm) |
| L24*W10*H10mm | L24*W14*H30mm | 46-mesh | 2mm | 700r/min | 30 min | 0.83 | 0.08 | 0.03 |
| Ditto | Ditto | Ditto | Ditto | Ditto | Ditto | 0.84 | 0.81 | 0.03 |
| Ditto | Ditto | Ditto | Ditto | Ditto | Ditto | 0.87 | 0.85 | 0.02 |
| Ditto | Ditto | Ditto | Ditto | Ditto | Ditto | 0.86 | 0.83 | 0.03 |
| Ditto | Ditto | Ditto | Ditto | Ditto | Ditto | 0.82 | 0.80 | 0.04 |
| Ditto | Ditto | Ditto | Ditto | Ditto | Ditto | 0.82 | 0.80 | 0.02 |
| Ditto | Ditto | Ditto | Ditto | Ditto | Ditto | 0.84 | 0.81 | 0.03 |
| Ditto | Ditto | Ditto | Ditto | Ditto | Ditto | 0.81 | 0.78 | 0.03 |
| Ditto | Ditto | Ditto | Ditto | Ditto | Ditto | 0.86 | 0.83 | 0.03 |
| Ditto | Ditto | Ditto | Ditto | Ditto | Ditto | 0.82 | 0.78 | 0.04 |
| Ditto | Ditto | Ditto | Ditto | Ditto | Ditto | 0.86 | 0.83 | 0.03 |
| Ditto | Ditto | Ditto | Ditto | Ditto | Ditto | 0.88 | 0.85 | 0.03 |

Fig. 2

| Experiment Parameters | | | | | | Experiment results | | |
|---|---|---|---|---|---|---|---|---|
| Specification of magnets for the grinding rotor in the upper part | Specification of driving magnets on the bottom | Specification of magnets for the grinding rotor in the upper part | Specification of driving magnets on the bottom | Specification of magnets for the grinding rotor in the upper part | Specification of driving magnets on the bottom | Specification of magnets for the grinding rotor in the upper part | Specification of driving magnets on the bottom | Grinding and thinning amount (mm) |
| L24*W10*H10mm | L24*W14*H30mm | 46-mesh | 2mm | 800r/min | 30 min | 0.82 | 0.78 | 0.04 |
| Ditto | Ditto | Ditto | Ditto | Ditto | Ditto | 0.84 | 0.80 | 0.04 |
| Ditto | Ditto | Ditto | Ditto | Ditto | Ditto | 0.79 | 0.74 | 0.05 |
| Ditto | Ditto | Ditto | Ditto | Ditto | Ditto | 0.77 | 0.73 | 0.04 |
| Ditto | Ditto | Ditto | Ditto | Ditto | Ditto | 0.73 | 0.70 | 0.03 |
| Ditto | Ditto | Ditto | Ditto | Ditto | Ditto | 0.84 | 0.81 | 0.03 |
| Ditto | Ditto | Ditto | Ditto | Ditto | Ditto | 0.86 | 0.81 | 0.05 |
| Ditto | Ditto | Ditto | Ditto | Ditto | Ditto | 0.83 | 0.80 | 0.03 |
| Ditto | Ditto | Ditto | Ditto | Ditto | Ditto | 0.79 | 0.76 | 0.03 |
| Ditto | Ditto | Ditto | Ditto | Ditto | Ditto | 0.71 | 0.67 | 0.04 |
| Ditto | Ditto | Ditto | Ditto | Ditto | Ditto | 0.81 | 0.77 | 0.04 |
| Ditto | Ditto | Ditto | Ditto | Ditto | Ditto | 0.82 | 0.78 | 0.04 |

Fig. 3

METHOD FOR PRODUCING GOLF CLUB HEAD WITH ULTRA-THIN CROWN

TECHNICAL FIELD

The present invention relates to a method for processing a golf club head, particularly to a method for producing a golf club head with an ultra-thin crown.

BACKGROUND OF THE INVENTION

Golf is a kind of ball game of putting via a club. At present, golf has become a synonym for noble sports. As a sport integrating the joys of nature, physical exercises and games, golf is favored by more and more people.

For a golf game, equipments, such as a golf club and a golf ball, are required. Among these equipments, golf club head forms a part of the golf club. One of the development trends of the golf club head both at home and abroad is ultra-thin golf club head. Usually, it is required that: for a golf club head, the overall thickness of a thin area should be less than or equal to 0.6 mm, furthermore, for some golf club heads, the thickness of a thin area should be less than or equal to 0.5 mm, the tolerance of thickness is ±0.10 mm; and, the thin area of a golf club head is approximately located in a top area of the golf club head. At present, by the casting techniques mastered by the golf club head casting manufacturers both at home and abroad, it can be ensured that the minimum wall thickness of the top thin area of a golf club head is greater than or equal to 0.68 mm. There is a huge gap between the products made by using such processes and the customer demands, and these products are far from sufficient to meet the technical requirements of most customers.

In golf club head manufacturing enterprises, due to the restriction of the casting level, the existing method for producing a golf club head is as follows: the top of a golf club head is thickened for casting to obtain a golf club head, the thickness of the top thin area of which is greater than or equal to 0.68 mm, and the golf club head is then subjected to pickling to be thinned. However, this method can not meet the technical requirements of the massive industrial production of ultra-thin golf club heads, this is because:

1) after pickling, absorption of hydrogen of different degrees will occur on the surface of golf club heads, and it is difficult to ensure that there is no crack on the golf club heads during a putt as the absorption of hydrogen will deteriorate the ductility and impact toughness of material, so most customers will not accept golf club heads made by thickening the golf club head for casting and then thinning it by pickling;

2) as there may be cracks on some golf club heads during the pickling of the golf club heads, some golf club heads will be scrapped during the production; as a result, the yield is low, and the production cost is increased;

3) as the thinning amount to the thickness is not uniform during the pickling of the golf club heads, some golf club heads will be scrapped due to a size beyond an allowed error range, and the production cost is further increased; and 4) due to the pickling process, the treatment of the pickling liquor used during the pickling and thinning process of the golf club heads will pollute the environment; for these reasons, the technique of preparing a golf club head with an ultra-thin crown has become a bottleneck in the field of golf club head at present.

As the top thin area of a golf club head has curved surfaces of different radian and the radius of curved surfaces at different positions is different, the existing grinding-wheel polishing devices can not realize uniform polishing and thinning of the curved surfaces of the golf club heads due to the restriction of shape, this is because:

1) during the polishing of a golf club head, as the force stressed manually on the golf club head is not uniform, the thinning amount to thickness at each position on the top of the golf club head is not uniform; as a result, some golf club heads will be scrapped due to a size beyond the tolerance;

2) as the top area of a golf club head has complicated profile of curved surfaces, it is difficult to ensure that the profile of the curved surfaces will not be damaged during the polishing; furthermore, it is difficult to keep the profile of the curved surfaces of all polished golf club heads consistent during the massive production, this is one of reasons for high scrap rate; and 3) at present, there is no applicable and available industrial device for polishing and thinning a golf club head both at home and abroad, so the automation control can not be achieved.

SUMMARY OF THE INVENTION

Given the above problems, an object of the present invention is to disclose a method for producing a golf club head with an ultra-thin crown. The present invention, with advantages of uniform thinning of a golf club head and automation control, is applicable to mass industrial production. The processing method and corresponding processing device provided by the present invention are applicable to production of golf club heads with an ultra-thin crown made of titanium alloy, stainless steel and other non-magnetic materials.

To achieve the object of the present invention, the present invention employs the following technical solutions.

A method for producing a golf cub head with an ultra-thin crown is provided, characterized in that a golf club head with an ultra-thin crown is produced by a magnetically driven grinding method, specifically: a grinding rotor, with an abrasive on the surface, is placed in a to-be-grinded area inside a cavity of the golf club head, the outside of the golf club head is provided with a rotary working shaft of high-speed rotation, one end of which corresponding to the grinding rotor is provided with driving magnets, and the driving magnets of the rotary working shaft are driven by a driving device to make the grinding rotor rotate synchronously so that the grinding rotor that is rotating performs multi-point thinning and grinding to the cavity within the to-be-grinded area of the golf club head.

In the method for producing a golf cub head with an ultra-thin crown, the method for the grinding rotor that is rotating to perform multi-point thinning and grinding to the cavity within the to-be-grinded area of the golf club head is as follows: the golf club head is fixed, and the grinding path of the driving device is set to perform movement in three-dimensional, four-dimensional or five-dimensional, at this time, the grinding rotor is driven by the driving magnets of the rotary working shaft to rotate to perform multi-point thinning and grinding to the cavity within the to-be-grinded area of the golf club head.

In the method for producing a golf club head with an ultra-thin crown, an alternative method for the grinding rotor that is rotating to perform multi-point thinning and grinding to the cavity within the to-be-grinded area of the golf club head is as follows: the driving device is fixed, and a fixed device of the golf club head moves according to a designed path, so that the grinding rotor is driven by the driving magnets of the rotary working shaft to rotate to perform multi-point thinning and grinding to the cavity within the to-be-grinded area of the golf club head.

In the method for producing a golf club head with an ultra-thin crown, a third alternative method for the grinding rotor that is rotating to perform multi-point thinning and grinding to the cavity within the to-be-grinded area of the golf club head is as follows: the driving device and a fixed device of the golf club head move in three-dimensional, four-dimensional or five-dimensional according to a designed path, so that self-rotation of the driving magnets drives the grinding rotor to rotate to perform multi-point thinning and grinding to the cavity within the to-be-grinded area of the golf club head.

In the method for producing a golf club head with an ultra-thin crown, the middle of the grinding rotor, with an abrasive on the surface, is provided with a rotor magnet, and the lower surface of the rotor magnet is provided with the abrasive; or, both the upper and lower surfaces of the rotor magnet are provided with the abrasive; or, at least four surfaces outside the rotor magnet are covered with the abrasive.

In the method for producing a golf club head with an ultra-thin crown, the rotor magnet covered with the abrasive on at least four surfaces has such a structure that: the abrasive as whole is designed as a cuboid hollow-groove type cavity structure with a straight-through central portion, the rotor magnet is fixed inside the cavity of the hollow wedge, and four surfaces of the abrasive are designed as curved surfaces.

In the method for producing a golf club head with an ultra-thin crown, the hollow wedge of the abrasive is of a square wedge structure, a transitional fillet of which is R0.5-R3.0 mm; the thickness of the abrasive at the end is 1-5 mm; and the radius of the curved surface of the abrasive is manufactured according to the radius of the curved surface of the crown of the golf club head, so that the surface of the abrasive can be fitted with the curved surface on the top of the golf club head during the grinding by the rotor.

In the method for producing a golf club head with an ultra-thin crown, the abrasive is made of any one of polishing abrasive and manufactured abrasive.

In the method for producing a golf club head with an ultra-thin crown, the rotor magnet is made of sintered Nd—Fe—B permanent magnet material and is a cuboid magnet, the size of the rotor magnet being designed and manufactured according to the spatial size of the cavity of the golf club head so that it is ensured that the grinding rotor can freely rotate in the cavity of the golf club head, the size of the magnet being 5-50 mm in length, 5-50 mm in width, and 3-30 mm in height.

In the method for producing a golf club head with an ultra-thin crown, the golf club head is applicable to a golf club head with an ultra-thin crown made of non-magnetic material.

In the method for producing a golf club head with an ultra-thin crown, the golf club head with an ultra-thin crown made of non-magnetic material includes a titanium alloy golf club head, a stainless steel golf club head and a nickel metal golf club head.

In the method for producing a golf club head with an ultra-thin crown, a bracket, having pits into which the driving magnets (4) are embedded at ends thereof, is sheathed on the rotary working shaft.

In the method for producing a golf club head with an ultra-thin crown, the rotary working shaft is driven by a motor and controller disposed on a numerical control three-dimensional working platform, the rotary working shaft and a golf club head installation rack being arranged at an interval, the golf club head being connected to the golf club head installation rack.

In the method for producing a golf club head with an ultra-thin crown, a magnet outside safety protection device is provided outside the rotary working shaft, and the magnet outside safety protection device being a sleeve that is slightly higher than the bracket and accommodates the driving magnets.

In the method for producing a golf club head with an ultra-thin crown, the magnet outside safety protection device outside the driving magnets is a sleeve that is connected to and follows the rotary working shaft; or, the lower end of the sleeve is fixed onto an outer shell of the motor and controller.

In the method for producing a golf club head with an ultra-thin crown, the top plane of the sleeve outside the driving magnets is 0.5-10 mm higher than the driving magnets, and the wall thickness of the sleeve made of non-magnetic material is 0.5-5 mm.

In the method for producing a golf club head with an ultra-thin crown, in the motor and controller, the motor is a brushless DC motor and the controller is a controller with digital display and stepless speed regulation functions.

In the method for producing a golf club head with an ultra-thin crown, the rated torque of the motor among the parameters of the brushless DC motor is 0.4-10 N·m.

In the method for producing a golf club head with an ultra-thin crown, the control range of the controller is any speed within a range of 0-3000 r/min.

In the method for producing a golf club head with an ultra-thin crown, when the top curved surfaces of the golf club head are actually grinded, the working speed of the grinding rotor is 50-3000 r/min.

In the method for producing a golf club head with an ultra-thin crown, when the top curved surfaces of the golf club head are actually grinded, the working speed of the grinding rotor is preferably 500-1200 r/min.

In the method for producing a golf club head with an ultra-thin crown, the driving magnets are made of sintered Nd—Fe—B permanent magnet material and are cuboid magnets, each of the driving magnets being 5-50 mm in length, 5-50 mm in width and 5-100 mm in height, the height direction being a magnetization direction, there being two driving magnets between which the distance is 1-20 mm; and the bracket for fixing the driving magnets is an integrated bracket made of non-magnetic material.

In the method for producing a golf club head with an ultra-thin crown, a method of a specific processing embodiment comprises the following steps:

1) a grinding rotor is placed within a golf club head, and then the golf club head is fixed on a golf club head installation rack; the fixation method is as follows: the connection lines between the top of the golf club head and the bottom of the golf club head are basically in one plane, and the connection lines between the top and bottom of the golf club head are horizontal when the top of the golf club head faces down during the fixation of the golf club head;

2) the motor and controller on the numerical control three-dimensional working platform are utilized, and the brushless DC motor drive the driving magnets on the rotary working shaft to perform three-dimensional movement along a designed grinding path, so that the grinding rotor is driven to move along the corresponding grinding track under the magnetism of the driving magnets; and the position of the golf club head is kept fixed during the grinding; and 3) when the top of the golf club head is grinded, the distance from the lowest point on the top of the golf club head to the driving magnets, the rotation speed of the grinding rotor, the speed and time for the circular grinding to the to-be-grinded area on the top of the whole golf club head are set, then the thickness points within different areas on the top of the golf club head are thinned, and finally, further processing may be performed to the obtained golf club head.

In the method for producing a golf club head with an ultra-thin crown, there are three methods for the device in the processing method to realize the grinding automation and the massive grinding and thinning to the top of the golf club head:

1) the motor is fixed on a numerical control three-dimensional, four-dimensional or five-dimensional working platform so that the movement of the working platform drives the motor to move, and the movement track and traveling speed of the driving magnets are designed by programming so that the automation control of the driving magnets in all spatial directions is realized, wherein the device may vary the size of the numerical control working platform according to the designed number of golf club heads to be grinded, and the working platform is provided with motors, the number of which is corresponding to the number of the golf club heads; the controller may be set in such a way that a single controller controls a plurality of motors, or, each motor is provided with a separate controller, so that the simultaneous grinding and thinning to the top of a plurality of golf club heads is realized;

2) the golf club heads are fixed on a numerical control three-dimensional, four-dimensional or five-dimensional working platform so that the movement of the working platform drives the golf club head to move; and the movement track and traveling speed of the golf club heads are designed by programming so that the automation control of the golf club heads in all spatial directions is realized; and 3) the golf club heads and the motors are fixed on respective numerical control three-dimensional, four-dimensional or five-dimensional working platform simultaneously, and the respective movement track and traveling speed are designed by programming, so that the simultaneous movement and automation control of the golf club heads and the motors are realized.

By the above technical solutions, the present invention has the following advantages:

compared with the prior art, the method for producing a golf cub head with an ultra-thin crown disclosed by the present invention effectively overcomes the problem that, due to the complicated curved surfaces in the top thin area of the golf club heads, a grinding-wheel polishing device can not realize uniform polishing and thinning of the curved surfaces of a golf club head. Meanwhile, the present invention is also applicable to forging a golf club head. By the technique disclosed by the present invention, uniform force and uniform thinning amount to a golf club head during the mechanical polishing can be realized; it is ensured that the profile of the curved surfaces will not be damaged during the polishing in the case of complicated profile; massive production and automation control are achieved; and, the corresponding manufacturing cost is reduced greatly.

1—Golf club head; 2—Abrasive; 3—Rotor magnet; 4—Driving magnets; 5—Bracket; 6—Rotary working shaft; 7—Magnet outside safety protection device; 8—Motor and controller; 9—Numerical control three-dimensional working platform; and, 10—Golf club head installation rack.

DETAILED DESCRIPTION OF THE INVENTION

The present invention will be described in more details with reference to the following embodiments. However, the present invention is not limited thereto.

Figure 1:
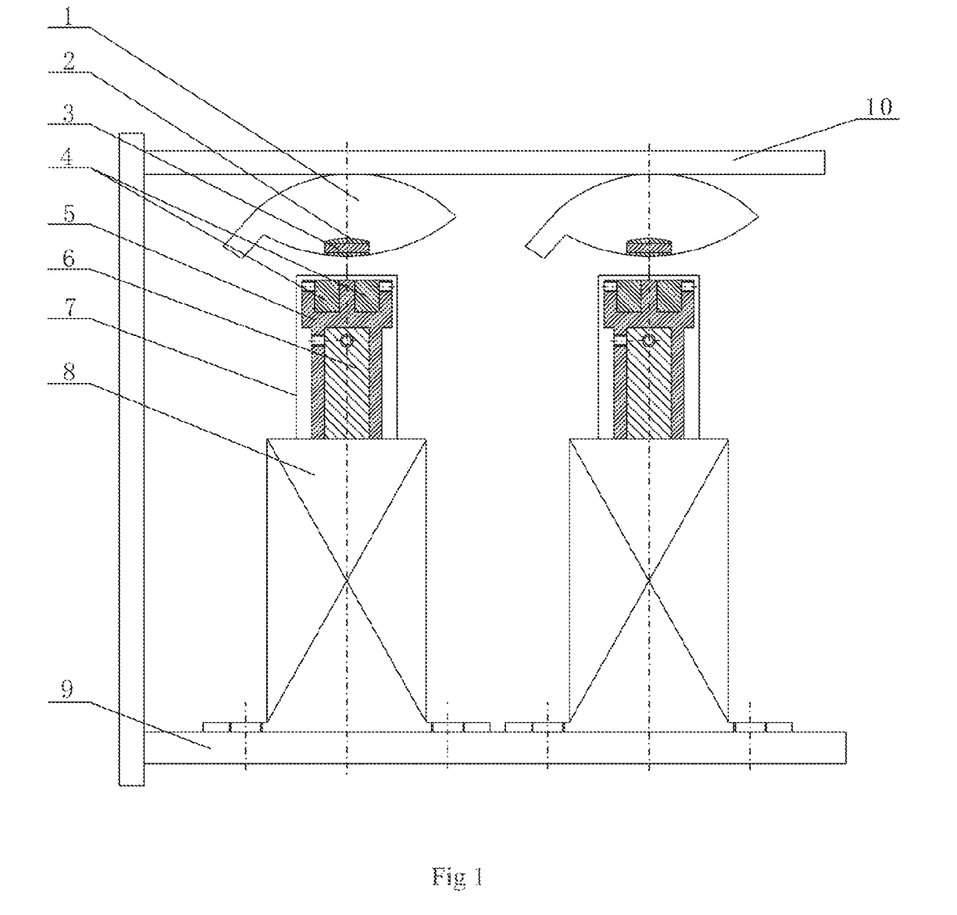
FIG. 1 is an application structure diagram of a device according to the present invention.

Referring to FIG. 1, in an embodiment of a processing device for producing a golf cub head with an ultra-thin crown, the processing device comprises a numerical control three-dimensional working platform 9, a motor and controller 8, a rotary working shaft 6, a bracket 5, a golf club head installation rack 10, driving magnets 4 and a rotor magnet 3. At least one motor and controller 8 is disposed on the numerical control three-dimensional working platform 9. The rotary working shaft 6 of the motor in the motor and controller 8 faces upward, and the upper part of the rotary working shaft 6 is provided with the bracket 5. The motor in the motor and controller 8 is a brushless DC motor, and the rated torque of the motor in the parameters of the brushless DC motor is 0.4-10 N·m. The controller is a controller with digital display and stepless speed regulation functions, wherein the control range of the controller is any speed within a range of 0-3000 r/min. The bracket 5 is a block with pits on the upper end surface. The driving magnets 4 are embedded into the pits on the upper end surface of the bracket 5. The golf club head installation rack 10 is provided with a gap therebetween over the upper ends of the driving magnets 4 located at the upper part of the bracket 5. At least one golf club head 1 is fixed under the golf club head installation rack 10 and is corresponding to the driving magnets 4. A grinding rotor, with abrasive 2 on the surface, is placed in the golf club head 1, and the grinding rotor follows the driving magnets 4.

In the present invention, considering the synchronous speed of the bracket 5 and the rotary working shaft 6, the bracket 5 and a bushing outside the rotary working shaft 6 may be integrated together. In the present invention, to prevent the driving magnets 4 from popping out during the high-speed rotation to injure the manufacturing workers, the outside of the driving magnets 4 is provided with a magnet outside safety protection device 7 with a gap therebetween. The magnet outside safety protection device 7 is a sleeve that is slightly higher than the bracket 5 and accommodates the driving magnets 4. The sleeve may be connected to and follow the rotary working shaft 6; or, the lower end of the sleeve is fixed onto the outer shell of the motor and controller 8, and the sleeve stands still when the rotary working shaft 6 rotates. The sleeve is 0.5-10 mm, preferably, 1 mm higher than the bracket 5. The sleeve is a cylinder or polygon, preferably, a cylinder, the diameter of which is 50 mm. The top plane of the cylinder is 0.5-10 mm higher than the driving magnets, the wall thickness of the cylinder is 0.5-5 mm, and the cylinder is made of non-magnetic material, optionally, austenitic stainless steel 304.

Further, the middle of the grinding rotor in the present invention is provided with a rotor magnet 3. The rotor magnet 3 is made of sintered Nd—Fe—B permanent magnetic material, and is a cuboid magnet in shape. The size of the rotor magnet 3 is designed and manufactured according to the spatial size of the cavity of the golf club head, so that it is ensured that the grinding rotor can rotate freely in the cavity of the golf club head. The magnet is 5-50 mm in length, 5-50 mm in width and 3-30 mm in height. The lower surface of the rotor magnet 3 is provided with the abrasive 2; or, both the upper and lower surfaces of the rotor magnet 3 are provided with the abrasive 2. As an alternative structure, the abrasive 2 as whole is designed as a cuboid hollow-groove type cavity structure with a straight-through central portion, and other four surfaces are designed as curved surfaces. The abrasive 2 is made of any one of polishing abrasive and manufactured abrasive, optionally, the manufactured abrasive 2 is the mixture of 46-mesh white fused alumina and brown fused alumina. The binder of the abrasive 2 is phenolic resin binder. The hollow wedge of the abrasive 2 is of a square wedge structure 10 mm in length, 12 mm in width and 12 mm in height. The transitional fillet of the square wedge is R0.5-R3 mm, the thickness of the abrasive at the end is 1-5 mm, and the radius of the curved surface of the abrasive is manufactured according to the radius of the curved surfaces of the crown of the golf club head, so that the surface of the abrasive can be fitted with the curved surfaces on the top of the golf club head during the grinding by the rotor. When the top curved surfaces of the golf club head are actually grinded, the working speed of the grinding rotor is 50-3000 r/min; and preferably, when the top curved surfaces of the golf club head are actually grinded, the working speed of the grinding rotor is 500-1200 r/min. To better describe the present invention, the radius of the curved surface of the abrasive may be manufactured according to a radius (130 mm) of a curved surface of the EXOTICS/1316-10.5-BODY-00 golf club head, so that the surface of the abrasive can be fitted with the curved surfaces on the top of the golf club head during the grinding by the rotor.

The driving magnets 4 in the present invention are made of sintered Nd—Fe—B permanent magnet material and are cuboid magnets. Each of the driving magnets 4 is 5-50 mm in length, 5-50 mm in width and 5-100 mm in height. The height direction is a magnetization direction. There are two driving magnets 4, and the distance between the two driving magnets is 1-20 mm. The bracket 5 for fixing the driving magnets 4 is an integrated bracket 5 made of non-magnetic material, optionally, austenitic stainless steel 304.

Figure 2:
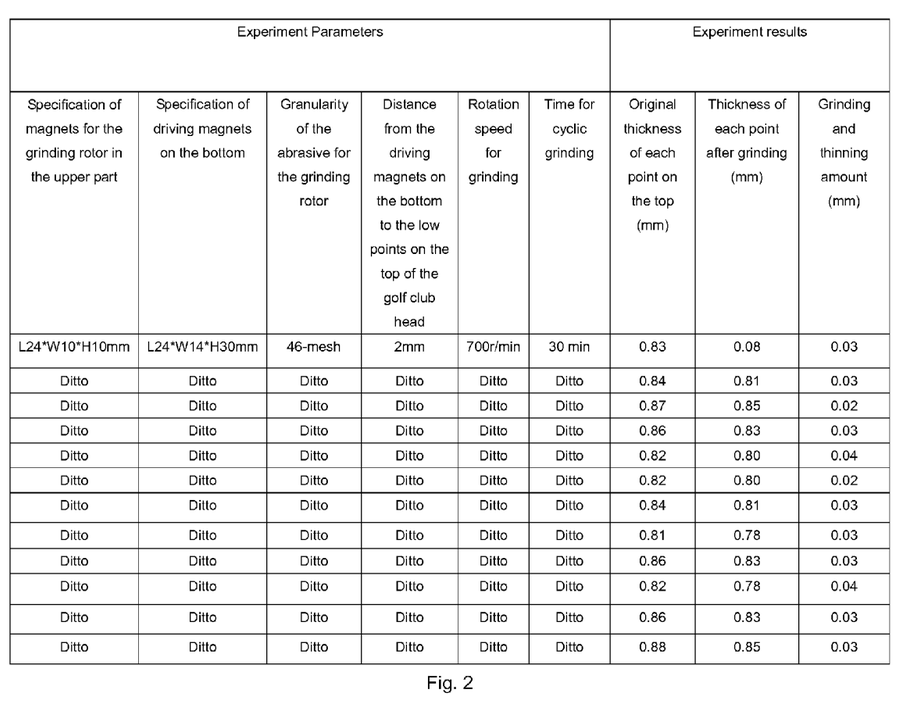
FIG. 2 is result 1 of magnetic grinding experiments to the EXOTICS/1316-10.5-BODY-00 golf club head according to the present invention.
Figure 3:
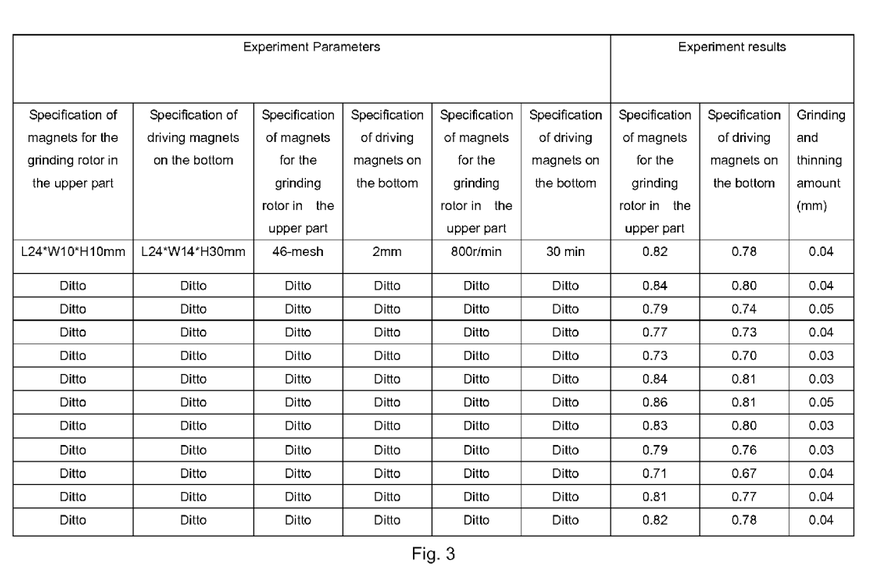
FIG. 3 is result 2 of magnetic grinding experiments to the EXOTICS/1316-10.5-BODY-00 golf club head according to the present invention.

In the present invention, when grinding experiments are performed to the EXOTICS/1316-10.5-BODY-00 golf club head, the distance from the lowest point on the top of the golf club head to the driving magnets is 2 mm, and the rotation speed of the grinding rotor is 700 r/min. It is assumed that the time for the circular grinding to the to-be-grinded area on the top of the whole golf club head is set as 30 min, the thinning amount to the thickness points within different areas on the top of the golf club head is 0.02-0.04 mm, as shown in FIG. 2. When the rotation speed of the grinding rotor is adjusted to 800 r/min, the thinning amount to the thickness points within different areas on the top of the golf club head is 0.03-0.05 mm, as shown in FIG. 3.

By the device provided by the present invention, the thickness tolerance of all golf club heads after the top has been grinded and thinned may be controlled within a tolerance range allowed by customers, and the automation control is realized. The device and the grinding process may be applied to massive industrial production.

In the present invention, a golf club head with an ultra-thin crown is produced by a magnetically driven grinding method, specifically: a grinding rotor, with an abrasive 2 on the surface, is placed in a to-be-grinded area inside a cavity of the golf club head 1, the outside of the golf club head 1 is provided with a rotary working shaft 6 of high-speed rotation, one end of which corresponding to the grinding rotor is provided with driving magnets 4, and the driving magnets of the rotary working shaft 6 are driven by a driving device to make the grinding rotor rotate synchronously so that the grinding rotor that is rotating performs multi-point thinning and grinding to the cavity within the to-be-grinded area of the golf club head 1; or, the method for the grinding rotor that is rotating to perform multi-point thinning and grinding to the cavity within the to-be-grinded area of the golf club head 1 is as follows: the golf club head 1 is fixed, and the grinding path of the driving device is set to perform movement in three-dimensional, four-dimensional or five-dimensional, at this time, the grinding rotor is driven by the driving magnets 4 of the rotary working shaft 6 to rotate to perform multi-point thinning and grinding to the cavity within the to-be-grinded area of the golf club head 1; or, an alternative method for the grinding rotor that is rotating to perform multi-point thinning and grinding to the cavity within the to-be-grinded area of the golf club head 1 is as follows: the driving device is fixed, and a fixed device of the golf club head 1 moves according to a designed path, so that the grinding rotor is driven by the driving magnets 4 of the rotary working shaft 6 to rotate to perform multi-point thinning and grinding to the cavity within the to-be-grinded area of the golf club head 1.

The method for producing a golf club head with an ultra-thin crown disclosed by the present invention comprises the following specific processing steps.

The processing process will be illustrated as below by taking EXOTICS/1316-10.5-BODY-00 golf club head 1 as example. However, the EXOTICS/1316-10.5-BODY-00 golf club head 1 described here is just an example provided for those skilled in the art to understand the present invention conveniently. It is to be noted that embodiments referenced here will not form any specific limitations to the present invention.

1) A grinding rotor is placed within a golf club head 1, and then the golf club head 1 is fixed on a golf club head installation rack 10; the fixation method is as follows: the connection lines between the top of the golf club head 1 and the bottom of the golf club head 1 are basically in one plane, and the connection lines between the top and bottom of the golf club head 1 are horizontal when the top of the golf club head faces down during the fixation of the golf club head 1;

2) the motor and controller 8 on the numerical control three-dimensional working platform 9 are utilized, and the brushless DC motor drives the driving magnets 4 on the rotary working shaft 6 to perform three-dimensional movement 100*100*100 mm in stroke on X, Y and Z along a designed grinding path, so that the grinding rotor is driven to move along the corresponding grinding track under the magnetism of the driving magnets 4; and the position of the golf club head is kept fixed during the grinding; and 3) when the top of the golf club head 1 is grinded, the distance from the lowest point on the top of the golf club head 1 to the driving magnets is 2 mm, and the rotation speed of the grinding rotor is 700 r/min; it is assumed that the time for the circular grinding to the to-be-grinded area on the top of the whole golf club head is set as 30 min, the thinning amount to the thickness points within different areas on the top of the golf club head is 0.02-0.04 mm; and, when the rotation speed of the grinding rotor is adjusted to 800 r/min, the thinning amount to the thickness points within different areas on the top of the golf club head is 0.03-0.05 mm.

Further, the parameters of the brushless DC motor include: rated voltage 220 VAC, rated power 400 W, rated rotation speed 3000 Rpm, and rated torque 1.27 N·m; and the controller of motor is a controller with the digital display and stepless speed regulation functions, so that it is ensured that any speed within a range of 0-3000 r/min may be achieved.

According to the processing method for producing a golf club head with an ultra-thin crown, there are three methods for the device to realize the grinding automation and the massive grinding and thinning to the top of the golf club head:

1) the motors are fixed on a numerical control three-dimensional, four-dimensional or five-dimensional working platform so that the movement of the working platform drives the motors to move, and the movement track and traveling speed of the driving magnets are designed by programming so that the automation control of the driving magnets in all spatial directions is realized, wherein the device may vary the size of the numerical control working platform according to the designed number of golf club heads to be grinded, and the working platform is provided with motors, the number of which is corresponding to the number of the golf club heads; the controller may be set in such a way that a single controller controls a plurality of motors, or, each motor is provided with a separate controller, so that the simultaneous grinding and thinning to the top of a plurality of golf club heads is realized;

2) the golf club heads 1 are fixed on a numerical control three-dimensional, four-dimensional or five-dimensional working platform so that the movement of the working platform drives the golf club head to move; and the movement track and traveling speed of the golf club heads are designed by programming so that the automation control of the golf club heads in all spatial directions is realized; and 3) the golf club heads and the motors are fixed on respective numerical control three-dimensional, four-dimensional or five-dimensional working platform simultaneously, and the respective movement track and traveling speed are designed by programming, so that the simultaneous movement and automation control of the golf club heads and the motors are realized.

It is to be noted that the processing of the EXOTICS/1316-10.5-BODY-00 golf club head 1 provided in the present invention is just one method for processing the golf club head 1 as an implementation of the present invention. In addition, the variations of the protection device and the grinding rotor of the present invention, which may be understood by those skilled in the art according to conventional knowledge, will not be explained in details in the present invention.

The golf club head 1 provided by the present invention is applicable to a golf club head 1 with an ultra-thin crown made of non-magnetic material; and the golf club head 1 with an ultra-thin crown made of non-magnetic material include a titanium alloy golf club head 1, a stainless steel golf club head 1 and a nickel metal golf club head 1.

The present invention is applicable to not only a cast golf club head, but also a wrought golf club head.

The embodiments used here for the disclosure of the object of the present invention are regarded to be appropriate currently. However, it should be understood that the present invention is intended to cover all variations and improvements of all embodiments falling into the idea and the scope of the present invention.

The invention claimed is:

1. A method for producing a golf club head with an ultra-thin crown, characterized in that a golf club head with an ultra-thin crown is produced by a magnetically driven grinding method, the method comprising:
    placing a grinding rotor, with an abrasive (2) on the surface, in a to-be-grinded area inside a cavity of the golf club head (1);
    providing, outside the golf club head (1), a rotary working shaft (6) of high-speed rotation;
    providing driving magnets (4) at an end of the rotary working shaft (6) corresponding to the grinding rotor; and
    driving, by a driving device, the driving magnets (4) of the rotary working shaft (6) to make the grinding rotor rotate synchronously so that the grinding rotor that is rotating performs multi-point thinning and grinding to the cavity within the to-be-grinded area of the golf club head (1).

2. The method for producing a golf club head with an ultra-thin crown according to claim 1, wherein the method for the grinding rotor that is rotating to perform multi-point thinning and grinding to the cavity within the to-be-grinded area of the golf club head (1) is as follows: fixing the golf club head (1), and setting the grinding path of the driving device to perform movement in three-dimensional, four-dimensional or five-dimensional so that now the grinding rotor is driven by the driving magnets (4) of the rotary working shaft (6) to rotate to perform multi-point thinning and grinding to the cavity within the to-be-grinded area of the golf club head (1).

3. The method for producing a golf club head with an ultra-thin crown according to claim 1, wherein an alternative method for the grinding rotor that is rotating to perform multi-point thinning and grinding to the cavity within the to-be-grinded area of the golf club head (1) is as follows: fixing the driving device, and allowing a fixed device of the golf club head (1) to move according to a designed path so that the grinding rotor is driven by the driving magnets (4) of the rotary working shaft (6) to rotate to perform multi-point thinning and grinding to the cavity within the to-be-grinded area of the golf club head (1).

4. The method for producing a golf club head with an ultra-thin crown according to claim 1, wherein a third alternative method for the grinding rotor that is rotating to perform multi-point thinning and grinding to the cavity within the to-be-grinded area of the golf club head (1) is as follows: allowing the driving device and a fixed device of the golf club head (1) to move in three-dimensional, four-dimensional or five-dimensional according to a designed path so that self-rotation of the driving magnets (4) drives the grinding rotor to rotate to perform multi-point thinning and grinding to the cavity within the to-be-grinded area of the golf club head (1).

5. The method for producing a golf club head with an ultra-thin crown according to claim 1, wherein the middle of the grinding rotor, with an abrasive (2) on the surface, is provided with a rotor magnet (3), and the lower surface of the rotor magnet (3) is provided with the abrasive (2); or, both the upper and lower surfaces of the rotor magnet (3) are provided with the abrasive (2); or, at least four surfaces outside the rotor magnet (3) are covered with the abrasive (2).

6. The method for producing a golf club head with an ultra-thin crown according to claim 5, wherein the rotor magnet (3) covered with the abrasive (2) on at least four surfaces has such a structure that: the abrasive (2) as a whole is designed as a cuboid hollow-groove type cavity structure with a straight-through central portion, the rotor magnet (3) is fixed inside the cavity of the hollow wedge, and four surfaces of the abrasive (2) are designed as curved surfaces.

7. The method for producing a golf club head with an ultra-thin crown according to claim 6, wherein the hollow wedge of the abrasive (2) is of a square wedge structure, a transitional fillet of which is R0.5-R3.0 mm; the thickness of the abrasive at the end is 1-5 mm; and the radius of the curved surface of the abrasive is manufactured according to the radius of the curved surfaces of the crown of the golf club head, so that the surface of the abrasive can be fitted with the curved surfaces on the top of the golf club head during the grinding by the rotor.

8. The method for producing a golf club head with an ultra-thin crown according to claim 6, wherein the abrasive (2) is made of any one of polishing abrasive and manufactured abrasive.

9. The method for producing a golf club head with an ultra-thin crown according to claim 6, wherein the rotor magnet (3) is made of sintered Nd—Fe—B permanent magnet material and is a cuboid magnet, the size of the rotor magnet (3) being designed and manufactured according to the spatial size of the cavity of the golf club head so that it is ensured that the grinding rotor can freely rotate in the cavity of the golf club head, the size of the magnet being 5-50 mm in length, 5-50 mm in width, and 3-30 mm in height.

10. The method for producing a golf club head with an ultra-thin crown according to claim 1, wherein the golf club head (1) is applicable to a golf club head (1) with an ultra-thin crown made of non-magnetic material.

11. The method for producing a golf club head with an ultra-thin crown according to claim 1, wherein the golf club head (1) with an ultra-thin crown made of non-magnetic material include a titanium alloy golf club head (1), a stainless steel golf club head (1) and a nickel metal golf club head (1).

12. The method for producing a golf club head with an ultra-thin crown according to claims 1 to 4, wherein a bracket (5), having pits into which the driving magnets (4) are embedded at ends thereof, is sheathed on the rotary working shaft (6).

13. The method for producing a golf club head with an ultra-thin crown according to claim 12, wherein the rotary working shaft (6) is driven by a motor and controller (8) disposed on a numerical control three-dimensional working platform (9), the rotary working shaft (6) and a golf club head installation rack (10) being arranged at an interval, the golf club head (1) being connected to the golf club head installation rack (10).

14. The method for producing a golf club head with an ultra-thin crown according to claim 13, wherein a magnet outside safety protection device (7) is provided outside the rotary working shaft (6), and the magnet outside safety protection device (7) being a sleeve that is slightly higher than the bracket (5) and accommodates the driving magnets (4).

15. The method for producing a golf club head with an ultra-thin crown according to claim 14, wherein the magnet outside safety protection device (7) outside the driving magnets (4) is a sleeve that is connected to and follows the rotary working shaft (6); or, the lower end of the sleeve is fixed onto an outer shell of the motor and controller (8).

16. The method for producing a golf club head with an ultra-thin crown according to claim 15, wherein the top plane of the sleeve outside the driving magnets (4) is 0.5-10 mm higher than the driving magnets (4), and the wall thickness of the sleeve made of non-magnetic material is 0.5-5 mm.

17. The method for producing a golf club head with an ultra-thin crown according to claim 13, wherein, in the motor and controller (8), the motor is a brushless DC motor and the controller is a controller with digital display and stepless speed regulation functions.

18. The method for producing a golf club head with an ultra-thin crown according to claim 17, wherein the rated torque of the motor among the parameters of the brushless DC motor is 0.4-10 N·m.

19. The method for producing a golf club head with an ultra-thin crown according to claim 17, wherein the control range of the controller is any speed within a range of 0-3000 r/min.

20. The method for producing a golf club head with an ultra-thin crown according to claim 7, wherein, when the top curved surfaces of the golf club head are actually grinded, the working speed of the grinding rotor is 50-3000 r/min.

21. The method for producing a golf club head with an ultra-thin crown according to claim 20, wherein, when the top curved surfaces of the golf club head are actually grinded, the working speed of the grinding rotor is preferably 50-3000 r/min.

22. The method for producing a golf club head with an ultra-thin crown according to claim 12, wherein the driving magnets (4) are made of sintered Nd—Fe—B permanent magnet material and are cuboid magnets, each of the driving magnets (4) being 5-50 mm in length, 5-50 mm in width and 5-100 mm in height, the height direction being a magnetization direction, there being two driving magnets (4) between which the distance is 1-20 mm; and the bracket (5) for fixing the driving magnets (4) is an integrated bracket (5) made of non-magnetic material.

23. The method for producing a golf club head with an ultra-thin crown according to claim 1 or 2, wherein a method of a specific processing embodiment comprises the following steps:
   1) placing a grinding rotor within a golf club head (1), and then fixing the golf club head (1) on a golf club head installation rack (10); the fixation method is as follows: keeping the connection lines between the top of the golf club head (1) and the bottom of the golf club head (1) basically in one plane, making the top of the golf club head face down when fixing the golf club head (1), and keeping the connection lines between the top and bottom of the golf club head (1) at a horizontal position;
   2) next, by using the motor and controller (8) on the numerical control three-dimensional working platform (9), driving, by a brushless DC motor, the driving magnets (4) on the rotary working shaft (6) to perform three-dimensional movement along a designed grinding path, so that the grinding rotor is driven to move along the corresponding grinding track under the magnetism of the driving magnets (4); and keeping the position of the golf club head fixed during the grinding; and
   3) next, when grinding the top of the golf club head (1), setting the distance from the lowest point on the top of the golf club head (1) to the driving magnets, the rotation speed of the grinding rotor, the speed and time for the circular grinding to the to-be-grinded area on the top of the whole golf club head, then thinning the thickness points within different areas on the top of the golf club head, and finally, performing further processing to the obtained golf club head (1).

24. The method for producing a golf club head with an ultra-thin crown according to claim 23, wherein, for the device in the processing method, the grinding automation and the massive grinding and thinning to the top of the golf club head by:
   fixing the motor on a numerical control three-dimensional, four-dimensional or five-dimensional working platform so that the movement of the working platform drives the motor to move, and designing the movement track and traveling speed of the driving magnets by programming so that the automation control of the driving magnets in all spatial directions is realized, wherein the device may vary the size of the numerical control working platform according to the designed number of golf club heads to be grinded, and the working platform is provided with motors, the number of which is corresponding to the number of the golf club heads; the controller may be set in such a way that a single controller controls a plurality of motors, or, each motor is provided with a separate controller so that the simultaneous grinding and thinning to the top of a plurality of golf club heads is realized.

25. The method for producing a golf club head with an ultra-thin crown according to claim 23, wherein, for the device in the processing method, the grinding automation and the massive grinding and thinning to the top of the golf club head by:
  fixing the golf club heads (1) on a numerical control three-dimensional, four-dimensional or five-dimensional working platform so that the movement of the working platform drives the golf club head to move, and designing the movement track and traveling speed of the golf club heads by programming so that the automation control of the golf club heads in all spatial directions is realized.

26. The method for producing a golf club head with an ultra-thin crown according to claim 23, wherein, for the device in the processing method, the grinding automation and the massive grinding and thinning to the top of the golf club head by:
  fixing the golf club heads and the motors on respective numerical control three-dimensional, four-dimensional or five-dimensional working platform simultaneously, and designing the respective movement track and traveling speed by programming so that the simultaneous movement and automation control of the golf club heads and the motors are realized.

\* \* \* \* \*